United States Patent Office 2,885,353
Patented May 5, 1959

2,885,353

PROCESS FOR REFINING LUBRICATING OILS WITH AN ALKYLENE OXIDE AND AN ADSORBENT

Walter J. Sandner, Algonquin, and William L. Fierce, Carpentersville, Ill., assignors to The Pure Oil Company, Chicago, Ill., a corporation of Ohio No Drawing. Application October 25, 1955
Serial No. 542,787

13 Claims. (Cl. 208—263)

This invention relates to a method for refining mineral oils and, more particularly, this invention is directed to a process for contacting hydrocarbon mineral oil fractions with a synergistically cooperating two component system comprising a solid, porous, adsorbent material and a selected gaseous reagent to yield a product exhibiting improved characteristics, including a reduced acid number.

One of the processing steps involved in the production of modern, high quality lubricating oils is clay treating, a finishing step wherein the hydrocarbon oil fractions are contacted with clays to improve color, reduce the acid number, improve the viscosity index and impart other desirable properties to the oils, primarily by adsorption of deleterious components from the oils. Some of the deleterious components are very difficult to remove and, as a result, the quality of the lubricating oils after treatment has suffered accordingly. Various adsorbent materials, such as decolorizing clays, silica gel, activated charcoal, and gels of metal oxides, have been used or suggested in various contacting processes, for the reduction of impurities in hydrocarbon mineral oil fractions.

We have now discovered that a high percentage of the organic acidic constituents present in mineral oils, particularly lubricating oil stocks and especially the naphthenic acid-containing components, may be removed or converted to innocuous compounds, even with a reduction in the total amount of clay required in present processes per unit of mineral oil stock contacted, by introducing small quantities of alkylene oxides, such as ethylene oxide, into the clay treating vessel in contact with the feed stock and clay. We have discovered that the acid number of the lubricating oil stock may be significantly lowered when the contacting is carried out in a single step, that is when the lubricating oil stock is contacted with the clay and the ethylene oxide in one operation, as distinguished from first contacting the oil with one of the two reagents above named and then with the other. Such contacting is so effective that not more than one such contacting and treating stage need be resorted to, though similar subsequent contacting stages are also within the scope of our invention. Moreover, we have discovered that the type of clay may be either that designated acidic, such as, for example, Superfiltrol filter clay, or basic, such as, for example, bentonite filter clay, but we prefer the latter. The contacting is preferably conducted in an inert atmosphere substantially free of water vapor since more effective reduction of the acid number is obtained under these conditions.

It is, therefore, a primary object of this invention to provide a process for refining liquid hydrocarbons by utilizing clay or other equivalent solid, porous adsorbent material in combination with an alkylene oxide.

A second object of this invention is to provide a method for removing organic acids from liquid hydrocarbons, including lubricating oil stocks, by contacting the stocks with a porous adsorbent material concomitantly with an alkylene oxide.

A third object of this invention is to treat lubricating oil stocks with a combination of solid adsorbent material and one or more alkylene oxides in a single step to reduce the acidity of the oils to substantially zero and also to improve the viscosity index, carbon residue and steam emulsion number of the oils thereby.

A fourth object of this invention is to provide a method for the removal of naphthenic acids and their derivatives from lubricating oil stocks and/or for the conversion of acidic components in the stocks to innocuous compounds.

A further object of this invention is to provide a simple, economical and commercially advantageous clay contacting process utilizing alkylene oxide to produce lubricating oils having substantially zero acid number from acidic lubricating oil base stocks.

Further objects of this invention will be apparent from a study of the specification as hereafter set forth.

It should be noted that a particular point of novelty in our process comprises the use of two reagents together in a single step, rather than sequential contacting of the oil with the two reagents separately.

The mineral oil fractions which may be treated by the process of our invention include any having a substantial acidity which it is desired to remove. For example, mineral oil lubricating stocks, such as neutral oils of any viscosity and bright stocks of heavy, intermediate, or light viscosity obtained from any crude oil, such as Mid-Continent, Pennsylvania, or other crude oils, may be utilized. The mineral oils may have been first subjected to any standard refining process, such as solvent refining or acid refining. The hydrocarbon oil may also be a solvent extract obtained during the solvent refining of hydrocarbon stock by means of phenol, sulfur dioxide, or similar agents for extracting aromatics, or any combination of mineral oils, refined or unrefined, including extract oils or mixtures thereof.

The acid number of an oil is determined according to ASTM method D974–54T.

The solid, porous, adsorbent material which is one of the two reagents utilized in our process may, for example, be any acidic or basic type of clay such as Superfiltrol filter clay, bentonite filter clay, Attapulgus clay, Milwhite or other adsorbents, such as silica gel, activated charcoal, or activated alumina. The quantity of clay, or other solid, porous adsorbent utilized for reducing the proportion of acidic components in the oil, may vary within wide limits, depending upon the type of oil and the quantity of acidic components in the oil. Thus, for example, a charge oil, such as dewaxed bright stock having an acid number of 0.15, may be contacted with a bentonite type of clay in the proportion of 1–10 lbs. of clay per barrel of bright stock. Other suitable proportions of clay to oil may also be utilized, depending on the type of clay and oil.

The alkylene oxides which may be used singly or in admixture comprise any alkylene oxides, gaseous or liquid, such as, for example, ethylene oxide, propylene oxide, butylene oxide, etc., boiling below the customary maximum treating temperature of the oil (625° F.). An example of a suitable higher boiling alkylene oxide is dodecene oxide. The amount of alkylene oxide utilized is relatively small, such as for example, an amount of approximately 10–20 liters/min. to a barrel of hydrocarbon oil or about 0.2–0.8 cu. ft./min./barrel. Other suitable concentrations of ethylene oxide may be similarly used to advantage, depending upon the nature and acidity of the hydrocarbon oil being treated. The alkylene oxide is in the main recovered after contacting and may be recycled for recontacting without substantial loss.

The contacting of oil with adsorbent material and alkylene oxide may be carried out in any suitable treating vessel, such as a simple, closed kettle containing a substantially inert atmosphere, preferably nitrogen, above the level of the reactants in the vessel. The alkylene oxide is preferably added gradually over the entire contacting period at the rate of about 10–20 liters (0.2–0.8 cu. ft.) per minute per barrel of oil. Thus, 15 liters (0.5 cu. ft.)/min. of ethylene oxide may, for example, be adequate to treat the oil when utilized for example, with 5 lbs. of clay. A suitable non-limiting example of the method of contacting comprises introducing the hydrocarbon oil to the vessel to a desired level, and separately or simultaneously introducing clay contacting material in the form of fine or coarse granules to the treating vessel while bubbling up through the hydrocarbon oil and clay mixture, while they are under suitable agitation, the alkylene oxide if it is in gaseous form. If the alkylene oxide or mixture of alkylene oxides selected is in liquid form, the alkylene oxide or mixture of alkylene oxides may be added at any point into the hydrocarbon-clay mixture. Non-oxidizing or inert gas (nitrogen, methane, etc.) should be constantly flowed in and through the oil during the process to maintain a non-oxidizing atmosphere. The flow rate of inert gas may be, for example, at the rate of about 80–150 liters (3–5.4 cu. ft.)/min./barrel of oil. Thus, 100 liters (3.56 cu. ft.) of nitrogen/min./barrel of oil has been found to be effective.

The process is usually conducted as a single contacting step at elevated temperatures, in general, from about 250 to 625° F. The temperature most suitable will depend upon the physical characteristics of the lubricating oil stock and the economics of the process. Temperatures considerably lower than about 350° F. generally require longer contact times than are considered practical. The best results are ordinarily obtained when the temperature is held throughout the contacting period within the range of approximately 350–570° F. The pressure may be any found suitable, preferably atmospheric. The clay-alkylene oxide time of contacting with the hydrocarbon oil also necessarily varies according to the degree of acidity of the oil as well as other characteristics of the oil to be treated and other operating conditions. A suitable contacting time, for example, to reduce the acidity to substantially zero may comprise approximately 20–40 minutes when the charge oil has an initial acid number of approximately 0.15 and 15 liters (0.5 cu ft.)/minute of ethylene oxide are introduced together with 1–5 lbs. of clay per barrel of oil and 100 liters (3.56 cu. ft.)/min. of nitrogen.

The following examples more clearly describe the process of our invention:

EXAMPLE I

A dewaxed hydrocarbon oil bright stock having the following characteristics was utilized:

Table I
PHYSICAL CHARACTERISTICS OF DEWAXED HYDROCARBON OIL BRIGHT STOCK

| | |
|---|---|
| API gravity | 26 |
| Flash (° F.) | 570 |
| Fire (° F.) | 645 |
| Vis./100° F. | 2500 |
| Vis./130° F. | 940 |
| Vis./210° F. | 154 |
| NPA color | 8 |
| Pour point (° F.) | 0 |
| V.I. | 100 |

This bright stock was contacted for 35 minutes at atmospheric pressure and 510° F. with an acid-type, bentonite clay and substantially pure ethylene oxide, under a nitrogen atmosphere in a standard, closed-type, contacting vessel. The oil and clay were introduced to the vessel and agitated during the contacting while the ethylene oxide and nitrogen bubbled up through the oil-clay mixture. The results obtained are set forth in Table II below:

Table II
TREATMENT OF DEWAXED BRIGHT STOCK WITH VARIOUS CONTACTING AGENTS

| Run | Clay, lbs. per barrel of charge | Nitrogen, cc. per min/barrel of charge | Ethylene Oxide, cc. per min/barrel of charge | Product Acid Number |
|---|---|---|---|---|
| charge stock | | | | 0.15 |
| 1 | [1] 5 | 100,933 | | 0.12 |
| 2 | [1] 5 | 100,933 | 15140 | 0.10 |
| 3 | | 100,933 | 15140 | 0.14 |
| 4 [3] | | 100,933 | 15140 | 0.12 |
| 5 | [2] 5 | 100,933 | | 0.14 |
| 6 | [2] 5 | 100,933 | 15140 | 0.07 |
| 7 | [2] 1 | 100,933 | 15140 | 0.10 |
| 8 | [2] 3 | 100,933 | 15140 | 0.085 |
| 9 | [2] 0.3 | 100,933 | 15140 | 0.14 |

[1] Acidic type Superfiltrol filter clay used.
[2] Basic type bentonite filter clay used.
[3] The product from run 1 was treated in run 4 only with ethylene oxide.

It is seen from runs 1 and 5 that clay alone, whether it is acidic or basic, does not effect an appreciable lowering of the acid number of the hydrocarbon oil under the conditions of the above experimental runs. That is, when Superfiltrol filter clay was utilized alone in run 1, the acid number was reduced from an initial 0.15 to only 0.12. Likewise, when (in run 5) bentonite filter clay was used, alone, the acid number was only reduced a small amount, from 0.15 to 0.14. Similarly, it may be seen from run 3 when ethylene oxide was used alone that the acid number was only reduced to 0.14. However, when Superfiltrol filter clay was used together with the ethylene oxide in a single step, the acid number was appreciably reduced to 0.10. An even more favorable result was obtained in run 6 when the basic type bentonite filter clay was used together with ethylene oxide in a single step, the acid number reaching a very low value of 0.07.

The pronounced effect of even a small amount of basic type bentonite filter clay, that is, 1 pound (run 7) rather than five pounds (run 6) when used in combination with ethylene oxide, is seen in run 7 where the product acid number is 0.10 in comparison to 0.07 as in run 6. An intermediate result was obtained, as shown in run 8, when 3 pounds of the basic type bentonite filter clay were used in combination with the ethylene oxide, an acid number of 0.085 being the end result. It may be seen from run 9 that when only about 0.3 pound of basic type bentonite clay was used with the ethylene oxide, an almost insignificant change in the product acid number occurred, that is from 0.15 to 0.14.

The distinct advantage in utilizing the filter clay simultaneously with the alkylene oxide is clearly shown by a comparison of the results of run 4, in which the hydrocarbon oil stock was first treated according to the method set forth in run 1 (that is, with 5 pounds of acid type Superfiltrol filter clay), and then subsequently treated with the ethylene oxide in a separate step, with the results of run 2. The product oil in run 4 had an acid number of 0.12 as opposed to 0.10 for that of run 2 when the ethylene oxide was used simultaneously with the Superfiltrol filter clay. It, therefore, may be seen from the above results that it is advantageous to conduct the process in a single step utilizing both the clay and the ethylene oxide simultaneously. It is also evident that although good results may be obtained with an acidic type of clay, such as Superfiltrol filter clay, the most satisfactory results are obtained when a basic type of clay, such as a bentonite filter clay, is utilized simultaneously with an alkylene oxide, such as ethylene oxide, in sufficient amount, that is, preferably not less than about 3 pounds per barrel of oil having initial acid number of about 0.15.

The conventional clay treatment method is represented by runs 1 and 5 in which clay alone contacted the oil and the acid number under the conditions of the process was reduced from 0.15 to 0.12, and 0.15 to 0.14, respectively. The highest acid number obtained by utilization of the instant process was significantly lower, 0.10, and the lowest acid number obtained by the instant process was very much lower, 0.07, representing a distinct advancement over prior art processes. It appears that the minimum amount of bentonite filter clay to be used under the conditions of the above runs where the charge material has an acid number of about 0.15 lies between about 0.3 and 1.0 pound of clay per barrel of oil, the 0.3 pound yielding an unsatisfactory acid number of 0.14 and the 1 pound of clay yielding a satisfactory reduction in the acid number to 0.10.

EXAMPLE II

Dewaxed bright stock charge material identical with that utilized in Example I above is treated with propylene oxide in an amount of 15140 cc. (.535 cu. ft.) per minute/barrel of oil by bubbling the oxide through the oil while the oil is at a temperature of about 500° F., a pressure of one atmosphere, and under a blanket of nitrogen, the nitrogen being bubbled through the oil at the rate of 100,933 cc. (3.56 cu. ft.) per minute/barrel of oil. The oil while being contacted with propyleneoxide over a 30 minute period also is in contact with 5 pounds of bentonite-type filter clay/barrel of oil in a closed, conventional-type, steel treating vessel. The oil-clay mixture is under consistent agitation and the propylene oxide is passed through the mixture in the form of fine bubbles. The acid number of the oil after 30 minutes is reduced from an initial figure of approximately 0.15 to approximately 0.08 acid number.

It is seen from Example II that when propylene oxide is utilized instead of ethylene oxide, the process of our invention still produces a large decrease in the acid number when clay is also in contact with the oil over the treating period.

In reviewing the results of Examples I and II, it may be seen that the cooperation between the alkylene oxide reagent and the porous adsorbent material, for example, bentonite or Superfiltrol clay, is of a synergistic nature. That is, the results obtained in terms of acid number decrease are significantly greater when the clay and alkylene oxide are utilized simultaneously, then when one agent followed by the other is utilized. The instant process is not only more effective than prior art processes in reducing acid number, but is also a simple, rapid, unitary process, requiring no substantial change in pressure and a relatively low temperature, effective even with smaller amounts of clay than conventional processes utilize. Alkylene oxides having from 2 to 12 carbon atoms per molecule are effective for use in our process.

Modifications and alterations in the instant process and the apparatus for conducting the process as are within the skill of one versed in the art are also contemplated as within the scope of this invention.

We claim and particularly point out as our invention:

1. The method of reducing the organic acidity of mineral lubricating oil comprising contacting said oil at temperatures of about 350°–625° F. simultaneously with solid adsorptive clay and alkylene oxide volatile at the contacting temperature, the clay and alkylene oxide being used in such amounts as to synergistically effect reduction of the acid number, said contacting being carried out in a substantially moisture-free, non-oxidizing atmosphere for a period of time sufficient to affect a substantial reduction in acidity of the oil.

2. The method of reducing the acid number of bright stock which comprises contacting in a treating zone said stock at about 350–570° F. with at least about 80 liters of inert gas per minute per barrel of bright stock, and simultaneously with at least about 3 pounds, per barrel of bright stock, of an acidic-type contacting clay and ethylene oxide in an amount of about 15 liters per minute per barrel of bright stock for approximately 20–40 minutes.

3. The method of reducing the acid number of naphthenic acid-containing mineral lubricating oil comprising contacting said oil at temperatures of about 350–625° F. simultaneously with solid adsorptive substance from the group consisting of clay, silica gel, activated charcoal and activated alumina and alkylene oxide volatile at the contacting temperature, the amount of adsorptive substance and alkylene oxide being sufficient to synergistically effect reduction of said acid number, said contacting being carried out in an inert atmosphere substantially free of water vapor, and the time of said contacting being sufficient to effect a substantial reduction in the acidity of the oil.

4. The process of claim 3 in which said substance is an acidic clay, and said alkylene oxide is passed through said treating zone at the rate of at least about 10 liters per minute per barrel of oil stock.

5. The process of claim 4 in which said alkylene oxide is ethylene oxide.

6. The process of claim 5 in which said inert atmosphere comprises nitrogen and it is introduced to the treating zone at the rate of at least about 80 liters per minute per barrel of oil being treated.

7. The process of claim 4 in which said alkylene oxide is propylene oxide.

8. The process of claim 7 in which said inert atmosphere comprises nitrogen and it is introduced to the treating zone at the rate of at least about 80 liters per minute per barrel of oil being treated.

9. The process of claim 3 in which said substance is a basic clay and said alkylene oxide is passed through said treating zone at the rate of at least about 10 liters per minute per barrel of oil stock.

10. The process of claim 9 in which said alkylene oxide is ethylene oxide.

11. The process of claim 10 in which said inert atmosphere comprises nitrogen and it is introduced to the treating zone at the rate of at least about 80 liters per minute per barrel of oil being treated.

12. The process of claim 9 in which the alkylene oxide is propylene oxide.

13. The process of claim 12 in which said inert atmosphere comprises nitrogen and it is introduced to the treating zone at the rate of at least about 150 liters per minute per barrel of oil being treated.

References Cited in the file of this patent

UNITED STATES PATENTS

| | | |
|---|---|---|
| 2,495,851 | Lien et al. | Jan. 20, 1950 |
| 2,530,561 | Arnold et al. | Nov. 21, 1950 |
| 2,575,989 | Arundale et al. | Nov. 20, 1951 |
| 2,684,943 | Baker | July 27, 1954 |
| 2,808,365 | Jezl | Oct. 1, 1957 |